US012447769B2

(12) United States Patent
Foust

(10) Patent No.: US 12,447,769 B2
(45) Date of Patent: Oct. 21, 2025

(54) STRING LINE SUPPORT SYSTEM ENABLING SINGLE PERSON USE

(71) Applicant: Jay Foust, Redmond, OR (US)

(72) Inventor: Jay Foust, Redmond, OR (US)

( * ) Notice: Subject to any disclaimer, the term of this patent is extended or adjusted under 35 U.S.C. 154(b) by 414 days.

(21) Appl. No.: 17/225,432

(22) Filed: Apr. 8, 2021

(65) Prior Publication Data

US 2021/0316567 A1 Oct. 14, 2021

Related U.S. Application Data

(60) Provisional application No. 63/007,058, filed on Apr. 8, 2020.

(51) Int. Cl.
*B44D 3/38* (2006.01)

(52) U.S. Cl.
CPC .................................... *B44D 3/38* (2013.01)

(58) Field of Classification Search
CPC ............ E04G 21/1833; E04G 21/1808; E04G 21/1825; E04G 21/1816; E04G 21/00; E04G 21/1841; E04G 21/185; E04G 21/22; G01C 15/00; G01C 15/06; G01C 15/10
USPC ......... 33/404, 406, 408, 409, 410, 411, 412, 33/413, 414, 415
See application file for complete search history.

(56) References Cited

U.S. PATENT DOCUMENTS 1,594,836 A * 8/1926 Ingram ............... E04G 21/1825 33/408
2,659,973 A * 11/1953 Patzel ................ E04G 21/1825 33/410
2,758,379 A * 8/1956 Senk .................. E04G 21/1833 33/405
2,991,557 A * 7/1961 Bongiovanni ........ F16G 11/048 33/407
3,206,854 A * 9/1965 Andrews ............. E04G 21/1808 33/406
3,250,009 A * 5/1966 Oseka ................ E04G 21/1833 433/22
3,389,471 A * 6/1968 Blake ................. E04G 21/1816 33/406
3,451,136 A * 6/1969 Shuttle, Jr. ............ G01C 15/06 33/339
3,890,717 A * 6/1975 Haun ..................... G01C 15/00 33/1 LE
4,329,786 A * 5/1982 Martinez ............ E04G 21/1825 33/409
4,364,034 A * 12/1982 Bellatty ................ G08B 21/10 33/1 H
4,457,080 A * 7/1984 Glan .................. E04G 21/1808 33/413
4,924,579 A * 5/1990 Berendsen .......... E04G 21/1833 33/1 LE
4,932,134 A * 6/1990 Meadows ........... E04G 21/1833 33/405

(Continued)

*Primary Examiner* — Muhammad Ijaz
(74) *Attorney, Agent, or Firm* — Donn K. Harms

(57) ABSTRACT

A string line support for the positioning of a first end of a string line used for height measurement or chalk marking is provided, allowing a single user to secure the first end of a string at a desired position and extend the string line to a taught positioning for such height or other linear measurements. The string line is engaged at the first end to a connector clip which is removably positionable in a slot upon a housing that is positionable upon a member.

12 Claims, 8 Drawing Sheets

(56) References Cited

U.S. PATENT DOCUMENTS

| | | | | | |
|---|---|---|---|---|---|
| 5,003,701 | A * | 4/1991 | Hughes | E04G 21/1808 | 33/409 |
| 5,419,055 | A * | 5/1995 | Meadows | E04G 21/1808 | 33/518 |
| 5,492,294 | A * | 2/1996 | Haeussler | F16B 7/0493 | 248/300 |
| 5,549,415 | A * | 8/1996 | Evans | E03F 1/002 | 405/51 |
| 5,778,546 | A * | 7/1998 | Williamson | E04G 21/1833 | 33/405 |
| 5,873,211 | A * | 2/1999 | Post | E04G 21/1808 | 33/408 |
| 5,964,042 | A * | 10/1999 | Carper | E04G 21/1808 | 33/407 |
| 5,971,664 | A * | 10/1999 | Wilson | F16L 1/06 | 405/157 |
| 6,490,803 | B1 * | 12/2002 | Butters | E04G 21/1833 | 33/405 |
| 6,842,992 | B1 * | 1/2005 | Gitt | E04G 21/1825 | 33/1 LE |
| 7,669,343 | B2 * | 3/2010 | Reynolds | E04G 21/1816 | 33/408 |
| 7,946,046 | B1 * | 5/2011 | Carver | E04G 21/1825 | 33/408 |
| 9,650,793 | B2 * | 5/2017 | Otto | E04G 21/1825 | |
| 10,054,440 | B2 * | 8/2018 | Egan | E04G 21/00 | |
| 10,422,147 | B2 * | 9/2019 | Stuber | E04G 21/1841 | |
| 2002/0073571 | A1 * | 6/2002 | Brannon, Sr. | G01C 15/00 | 33/1 G |
| 2021/0316567 | A1 * | 10/2021 | Foust | B44D 3/38 | |

* cited by examiner

STRING LINE SUPPORT SYSTEM ENABLING SINGLE PERSON USE

This applications claims priority to U.S. Provisional Patent Application Ser. No. 63/007,058 filed on Apr. 8, 2020 which is incorporated herein in its entirety by this reference thereto.

BACKGROUND OF THE INVENTION

1. Field of the Invention

The invention herein disclosed relates generally to string lines and chalk lines used for level determination and marking. More particularly, it relates to a device configured to support both ends of a string line which is employed to determine slop or grading or the like, and which enables use by a single person.

2. Prior Art

In construction, a widely employed device for determining angles and slope for walls, floors, patios, and other structural elements, is a string line. In a conventional string line or snap string device, the string is wound into an internal cavity of a housing and onto a reel by rotating a handle. From this default positioning, the string may be unwound and engaged at a distal end to a fixed position, where after a slope may be determined from the positioning of the distal end of the string in relation to the wound end.

Where an accurate visual depiction of a desired angle or slope is desired, the housing is filled with chalk and as the string is pulled from the housing, chalk will adhere to the surface of the unwound string. To provide a visual marking or reference of a line at a determined angle or slope, the string is stretched taught between the distal end and the end engaged with the housing. Once so stretched, the string may be pulled to cause it to strike a surface whereupon it leaves a chalk marking on the surface which mirrors the slope and length of the deployed and stretched string.

In other modes of use of such string lines, the distal end of the string unwound from the reel in the housing is positioned at a determined first elevation. The proximal end of the string at the opening to the housing is positioned at a determined second elevation with the string held taught between the distal end and the proximal end. The slope of the string between the distal and proximal ends, with the string stretched tight, will provide a visual reference as to the slope of an underlying surface such as a ground surface on which a structure is to be positioned, to allow the user to form the structure level, or to grade the underlying ground surface to remove uneven areas and match the slope of the ground to that of the taught string.

A constant problem with using such string line and chalk line devices is that they require two persons to employ. Further, if one of the persons holding the distal or proximal ends of the string moves it from the proper position, the other person at the other end of the string will be unaware, and the resulting chalk line will be in the wrong place or at the wrong angle or slope.

With respect to the above, before explaining at least one preferred embodiment of the string line support device and system herein, it is to be understood that the system invention is not limited in its application to the details of employment and to the arrangement of the components or the steps set forth in the following description or illustrated in the drawings. The various apparatus and methods and steps of the herein disclosed string line deployment and support system herein are capable of other embodiments, and of being practiced and carried out in various ways, all of which will be obvious to those skilled in the art once the information herein is reviewed.

Also, it is to be understood that the phraseology and terminology employed herein are for the purpose of description and should not be regarded as limiting. As such, those skilled in the art will appreciate that the conception upon which this disclosure is based may readily be utilized as a basis for other string line support systems enabling use by a single person. It is important, therefore, that the embodiments, objects and claims herein, be regarded as including such equivalent construction and methodology insofar as they do not depart from the spirit and scope of the present invention.

SUMMARY OF THE INVENTION

The disclosed device herein, provides an adjustable string line support system, enabling a single person to deploy, stretch, and snap a chalk line, using a conventional string line component having a housing and internal reel on which the string is wound and coated with chalk. The device herein features at least one or a first, slidingly adjustable housing. This housing has an axial passage running therethrough which is sized and configured to translate upon a rigid member, such as a pipe, or reinforcing bar, which are widely employed on construction sites.

The housing, once positioned to a sliding engagement with the chosen rigid member, such as the noted pipe or reenforcing bar, is slidably adjustable to a height between the bottom of the member which normally intersects with the ground or a structural surface such as a wall or the like, and a top edge. A single user with the housing so engaged, can slide the housing to a desired height, which positions a string which is removably engaged to the housing using a connector, at the chosen height. Once positioned in the chosen location at the chosen height on the rigid member, a removably engageable connector allows the user to removably fix the position of the housing upon the member running through it.

Where a chalk line is to be employed to place chalk along a surface in a line mirroring that of the string, the distal end of the chalk line is engaged with the housing using a connector clip. This connector clip has a first end configured for a sliding engagement thereof, within a slot formed into the sidewall of the housing. With the connector clip so engaged with the housing, and the string engaged to the connector clip at the distal end thereof, the housing may be slid to a height on the rigid member which operatively positions the distal end of the string at the determined proper height. Thereafter, the string is stretched taught and the proximal end is positioned at a second proper determined height or positioning. With both ends so positioned, the string is pulled in a direction away from the surface to be marked with chalk, and then released. This will result in a chalk line on the surface running along a slope determined by the above referenced positioning of both ends.

In other uses, the string itself is positioned to provide the user a visual reference of a proper grade slope for the underlying ground surface. In such a deployment, the string will be positioned with both the distal end and proximal end engaged to fixed points. So positioned and taught between the engagements of the proximal and distal ends, the string provides the user with a visual reference on the need to grade an underlying surface.

The system herein, allows a single user to deploy a string line for either purpose noted above. When employed to snap a chalk line, the system provides for a fixed but temporary locating of the distal end of the string at a user determined location and height where after the user can stretch the string tight with the proximal end in a correct location for snapping the reference chalk line. Where employed as a visual reference for a proper underlying ground or surface slope between the proximal and distal ends of the string, the system herein allows for the use of a reeled snap line without the need to cut the string.

Particularly preferred in all modes of the device herein, is the connector clip, which as noted, is configured at a first end for a sliding engagement into a slot formed in the sidewall of the housing. The connector is shaped with at least one and preferably two recesses formed into a perimeter side edge thereof. These recesses allow for the string to be engaged to the connector clip, without the need to cut the string. A winding of the string around and into the connectors will provide a very stable but temporary engagement of the string thereto.

For additional security of the engagement of the string to the connector clip, an opening communicates through the connector clip body in between the two recesses formed into the perimeter edge thereof. This allows the string to be run through the opening, to be wound around the two recesses, and run back through the opening. Such provides a very stable engagement to one end of the string without the need for knotting and the like.

In cases where the string may be engaged for a visual reference rather than snapping a chalk line, a second housing may be employed with it slidingly positionable upon a second member to the determined proper height. A second connector clip is removably engageable at a first end thereof, with a slot formed in the sidewall of the second housing. The string can be wound around the side edges of the second connector clip where after the string line engaged to it may be positioned adjacent the member. This allows for use of a conventional string line, which is wound on a reel, without the need to cut the string during deployment with both ends held taught in their engagement to respective housings.

Using the system herein, a single user can position both ends of a string line, for either forming a chalk line on an adjacent surface or for deploying the taught string stretched between two members and housings, as a visual grade reference.

With respect to the above description, before explaining at least one preferred embodiment of the string line support system herein, it is to be understood that the invention is not limited in its application to the details of operation nor the arrangement of the components or the steps set forth in the following description or illustrations in the drawings. The various methods of implementation and operation of the method herein are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

Therefore, those skilled in the art will appreciate that the conception upon which this disclosure is based may readily be utilized as a basis for designing of other methods and systems for carrying out the several purposes of the disclosed string line support system. Therefore, that the objects and claims herein should be regarded as including such equivalent construction, steps, and methodology insofar as they do not depart from the spirit and scope of the present invention.

It is an object of this invention to provide an easily deployed string line support system enabling a single person to position string lines for forming chalk lines on a surface or to serve as a visual grade reference.

These, together with other objects and advantages which become subsequently apparent, reside in the details of the construction and operation of the system herein as more fully hereinafter described and claimed, reference being had to the accompanying drawings forming a part thereof, wherein like numerals refer to like parts throughout.

Further objectives of this invention will be ascertained by those skilled in the art as brought out in the following part of the specification wherein detailed description is for the purpose of fully disclosing the invention without placing limitations thereon.

BRIEF DESCRIPTION OF DRAWING FIGURE

DETAILED DESCRIPTION OF THE PREFERRED EMBODIMENTS OF THE INVENTION

Figure 1:
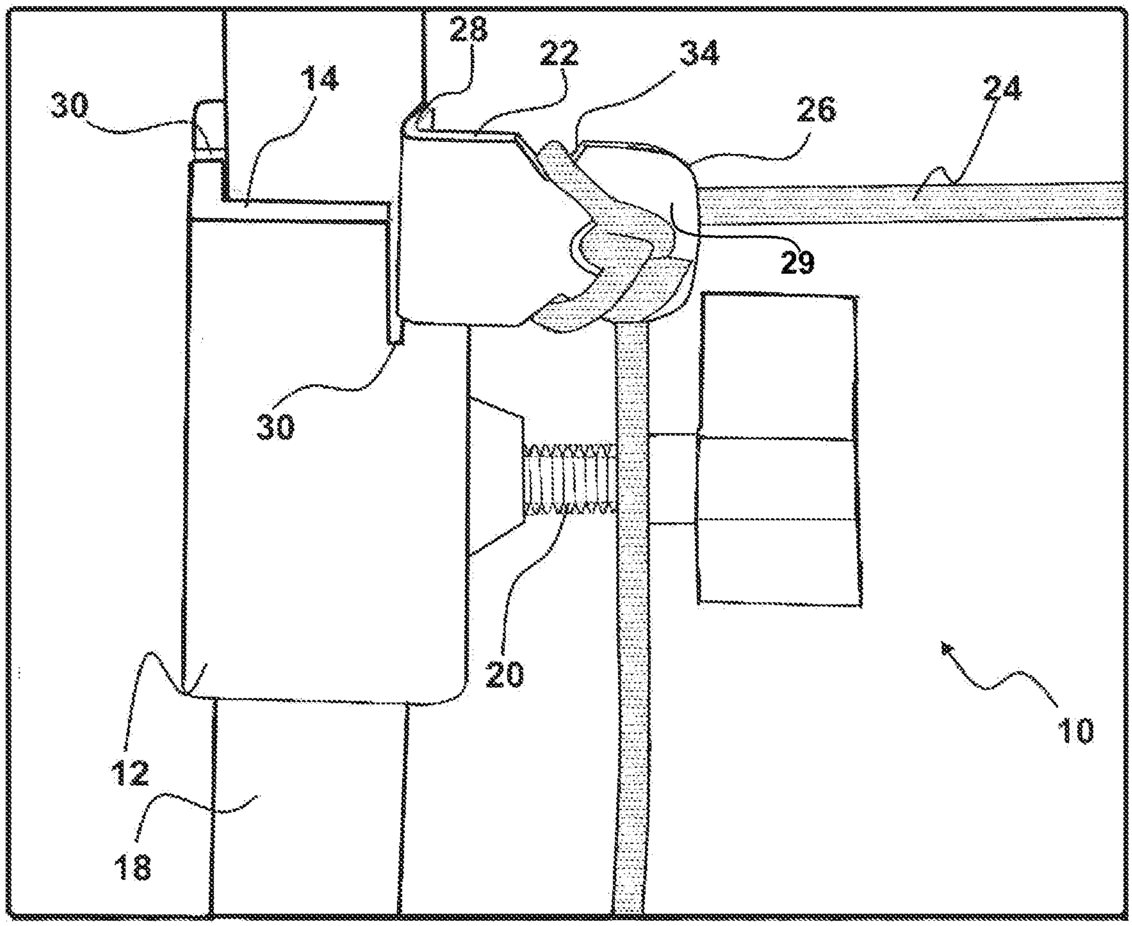
FIG. 1 depicts a side view of the housing configured with an axial passage sized for an adjustable sliding positioning upon a rigid member and showing a connector clip operatively engaged at a first end with a slot formed in the sidewall of the housing.

In this detailed description, the directional and locational terms and prepositions of up, upwardly, down, downwardly, front, back, top, upper, bottom, lower, left, right, first, second, and other such terms, are employed to refer to the device as it is oriented and appears in the drawings and are used for convenience only. Such terms they are not intended to be limiting in any fashion, or to imply that the device has to be used or positioned in any particular orientation. Further, such locational and directional terms may vary in the claims herein due to differing elements included in the order and drafting of the claims. Additionally, if not otherwise defined, where employed with reference to distance or an angle or other measurement, by the term substantially is meant, plus or minus five percent.

Referring now to the string line support device 10 herein in the depictions of FIGS. 1-9, there is seen in FIG. 1, a side view of the device 10 herein, showing the housing 12 formed by a sidewall 14 which surrounds and defines a size and shape of an axial passage 16 running through the housing 12. As noted, this axial passage 16 is sized to slide upon a rigid member 18 to various positions thereon. A position holding housing connector 20 is activated by a user to temporarily fix the position of the housing 12 on the member 18. As shown, this housing connector 20 may be a screw which communicates through the sidewall 14 to exert compressive force on the member 18 to hold the housing 12 temporarily in a fixed position on the member 18. It should be noted that the device 10 herein may include the member 18 or may be provided without the member 18 wherein the axial passage 16 of the housing can be sized for and/or slidably engaged upon an existing member 18 at a job site or one carried by a user. As long as the housing 12 has an axial passage 16 allowing passage of an intended member 18 therethrough, and the housing 12 can be fixed in position on the intended member 18, such as by the connector 22, the device 10 can be provided to be employed with any member 18 which is positioned or positionable to hold the housing 12 in place.

Particularly preferred, in all modes of the device 10 herein, is a connector clip 22 which is configured for a removable engagement to the housing 12 at or adjacent a first end thereof and for a removable engagement of a string 24 at a connection point 29. The connection point 29 should preferably removably engage to a first end of a string 24 used herewith at a mid section thereof in a manner extending the string 24 from such an engagement from a mid portion of the second end 26 of the connector clip 22. This projection of the string 24 from this mid portion of the second end 26 of the connector clip 22 is preferred because it gives the user a much better view of the string 24 when setting the proper position thereof, than a projection from a side surface of the connector clip 22, and it provides a predictable height positioning of the first end of the string 24. It should be noted that the string 24 can be provided with the device 10 herein, however, such string lines are widely available and it need not be provided herewith because the user can employ their own.

Figure 2:
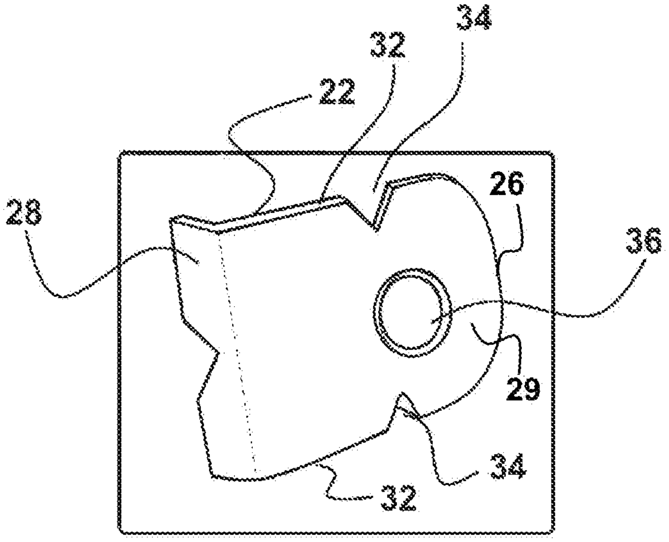
FIG. 2 shows the connector clip of the system herein, which is depicted in various figures, in operative engagement, at a first end with a respective housing.

As can be seen in FIGS. 1-2, the connector clip 22 is configured at a first end thereof, with a projection 28 which is sized and shaped for a sliding removable engagement into a connector clip mount, such as a slot 30 formed into the sidewall 14 of the housing 12. While the connector clip mount is shown as a slot 30 communicating through the sidewall 14 into the axial passage 16, a connector clip mount such as a slot 30 could also be formed on an exterior surface of the housing 12, by welding or otherwise attaching a connector thereon, such as by welding a second piece of metal with a slot between the exterior of the housing 12 and the second piece of metal, by positioning a hook on the exterior surface, or even positioning a strong magnet thereon to hold the connector clip 22 in position.

Consequently, the connector clip mount such as a slot 30 is meant to include other configurations where the projection 28 on a clip 22 can be removably engaged such as a slot 30, hook, magnet, or other connector which is positioned on or in the housing 12. However, currently, because of the ease of manufacture, and because of the significant resistance to damage a slot 30 formed in one or a plurality of positions on the sidewall 14 has shown to provide in experimentation, the formation of a connector clip mount configured as a slot 30 into one or preferably multiple areas upon the sidewall 14 is preferred.

So engaged, with the string 24 projecting from the mid portion of the second end 26 of the connector clip 22, the height of the housing 12 can then be adjusted to position a string 24 at the proper height or location desired by the user. As shown and noted herein, there can be multiple connector clip mounts such as slots 30 formed into the sidewall 14 of the housing 12, in different positions. Such is preferred to give the user the ability to position the housing 12 in the correct height, and then extend the string 24 in multiple directions from the housing 12, to discern multiple leveling and grading positions and the like. Preferably, at least two connector clip mounts such as slots 30 are formed, especially where the sidewall 14 runs in a rectangle to form a rectangular housing 12, and the two slots 30 are on sidewall portions which run normal or substantially perpendicular to each other.

The connector clip 22 is configured for tying or winding a string thereon at an engagement point 29, to removably engage one end of the string 24 to the connector clip. Currently, the engagement point for a preferred such engagement of the string 24 to the connector clip 22 is by a winding of a first end of the string 24 around the opposing side edges 32 of the connector clip 22.

At the connection point 29, at least one recess 34 and preferably two recesses 34 are formed into opposing side edges 32 of the clip 22, allow for a winding of the string 24 around first and second side edges 32 and into both recesses 34 during the removable winding engagement of a first end of the string 34 to the connection point 29. This winding into at least one, and preferably two opposing recesses 34, has shown to significantly strengthen the wound string engagement to prevent it from sliding off the connector clip 22 as the string is stretched taught. Of course, the string 24 could be tied or otherwise attached to the clip such as through a passage 36, but such takes longer to engage and remove.

Also shown and preferred at the connection point 29 on the connector clip 29, is a passage 36 communicating through the body of the connector clip 22. The passage 36 is positioned in between the opposing first and second side edges 32, at a central area in the body of the connector clip 22, located between the second end 26 and a first end which is at or adjacent the projection 28.

During the engagement of the string 24 to the connector clip 22, if the string is first communicated through the passage 36 and then wound around one or more recesses 34 in the side edges 32 of the connector clip 22, communication through the passage 36 centers the string 24 to project from a central area of the second end 26 of the connector clip 22 when tightened allowing the user to know where on the connector clip 22 a first end of a string will project from the connection point 29 which is helpful when positioning the first end of a string 24 at a desired height above an underlying surface. The communication of the first end of the string 24 through the passage 36, in addition to centering it in the projection from the second end, also enhances the connection of the wound engagement of the string 24. When the string 24 is pulled taught to measure a straight line between the first end engaged to the connector clip 22 and the distal end thereof, the pathway though the passage 36 and then wound around the opposing side edges 32 prevents the string from unwinding from the side edges 32 if it had just been wound therearound.

Figure 3:
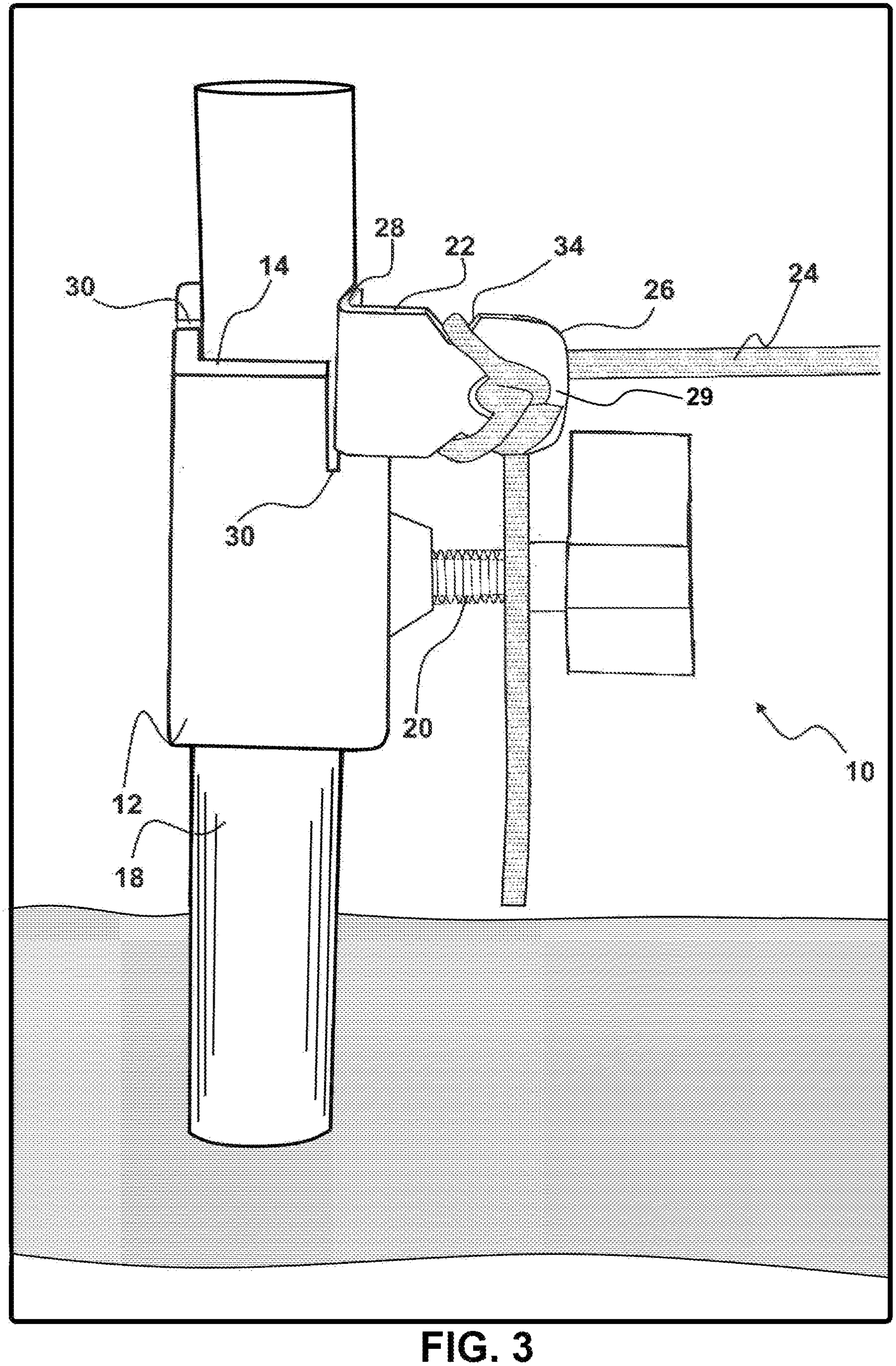
FIG. 3 shows the system herein as topically employed on a job site with the housing adjusted to a fixed position on a pole or member and the connector clip removably engaged to a taught string and the connector clip engaged in a slot in the housing at a first end.

Shown in FIG. 3, is an example of the system herein employed on a job site with a connector clip 22 removably engaged to a taught string 24, and the connector clip 22 in a removable engagement to the housing 12 with a connector clip mount thereon, such as by the engagement of the projection 28 on the clip 22 within a slot 30 in the sidewall 14 of the housing 12.

Figure 4:
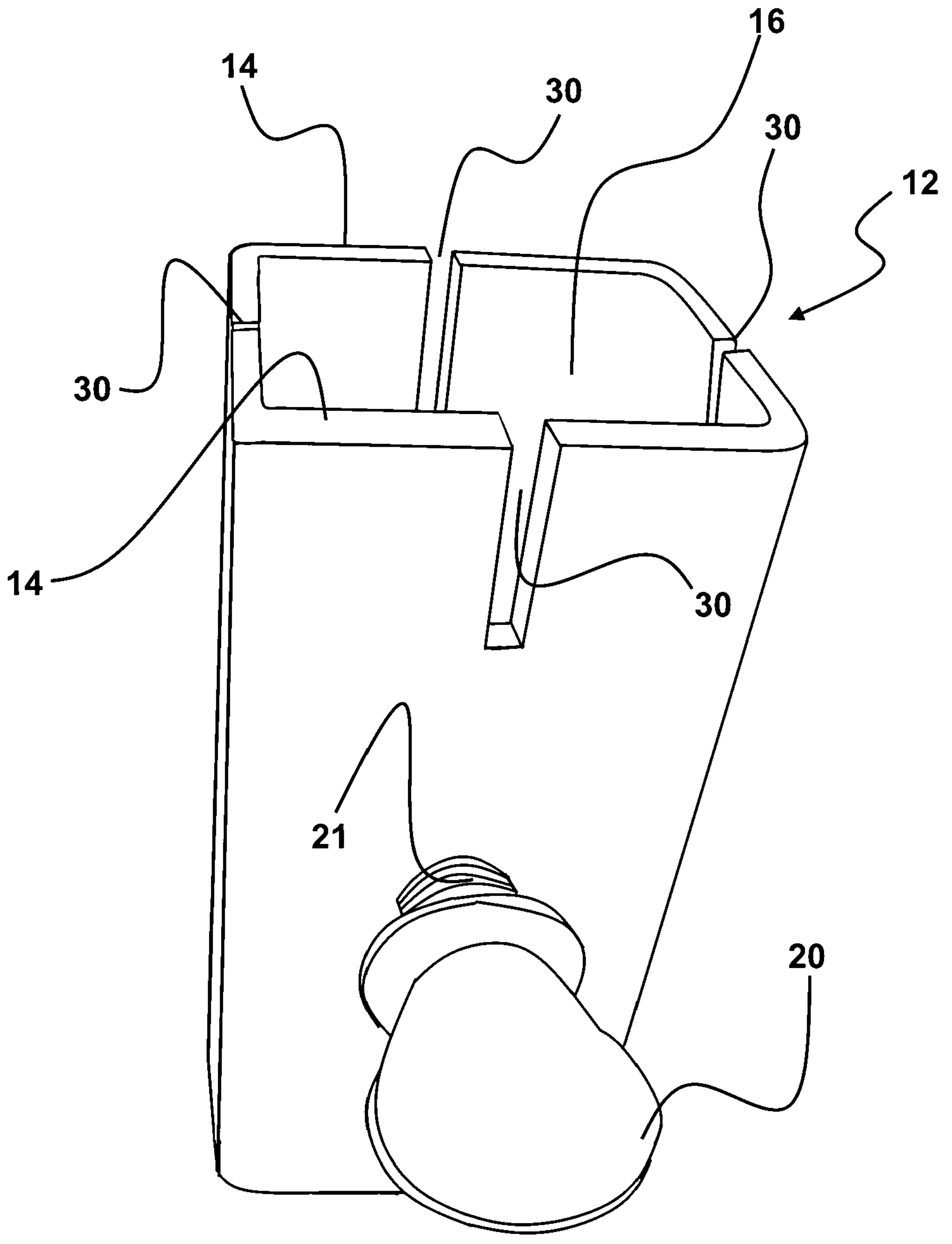
FIG. 4 depicts an enlarged overhead perspective view of the housing of FIGS. 1 and 3, and showing the axial passage communicating therethrough, and showing a plurality of secondary slots formed into the wall of the housing into which the connector clip of FIG. 2 is removably engageable.
Figure 6:
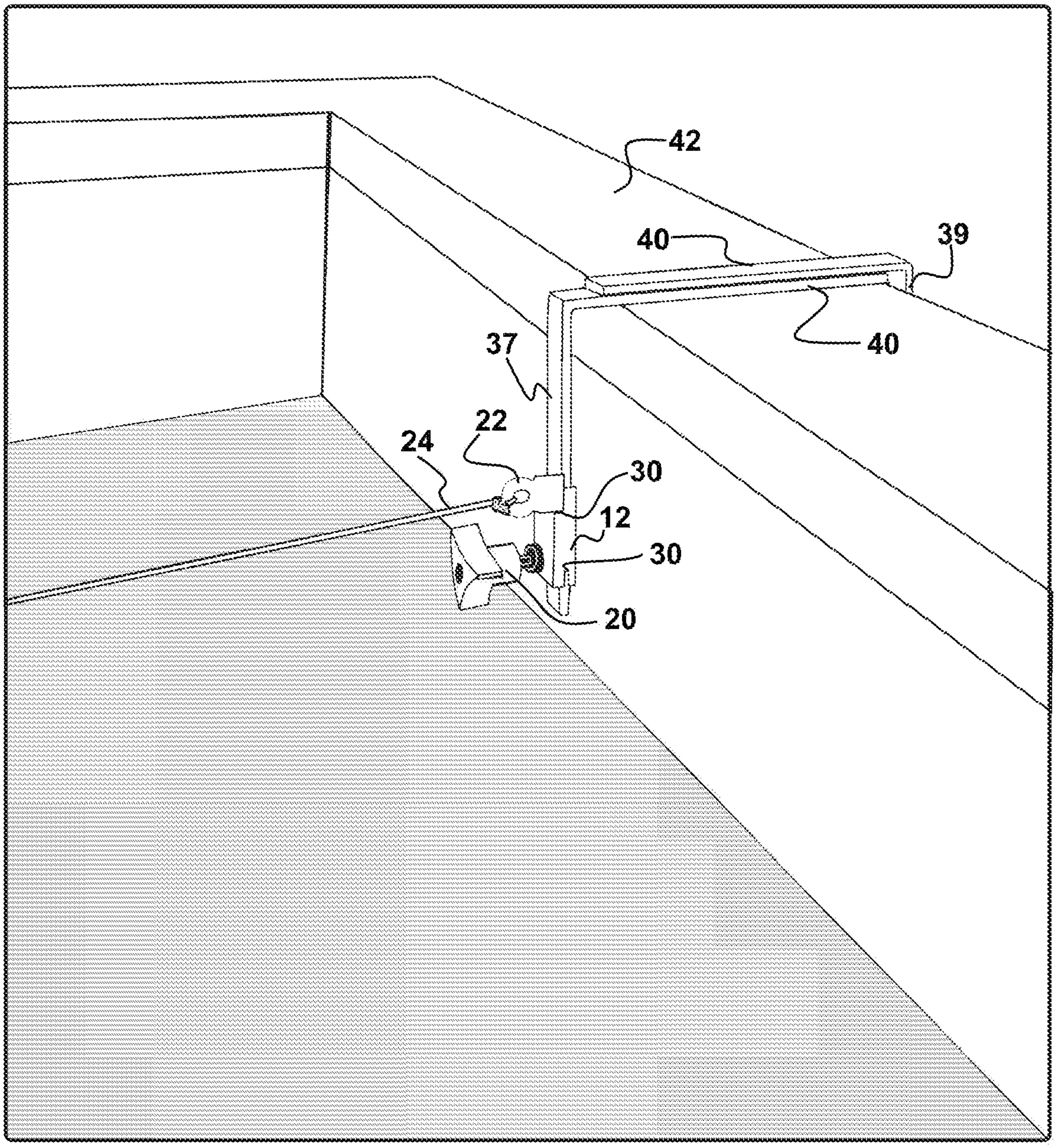
FIG. 6 shows a mode of the device of the system herein, having a member configured for a compressive engagement over a top edge of a wall and having a portion of a member in a sliding engagement with a housing positioned thereon.
Figure 7:
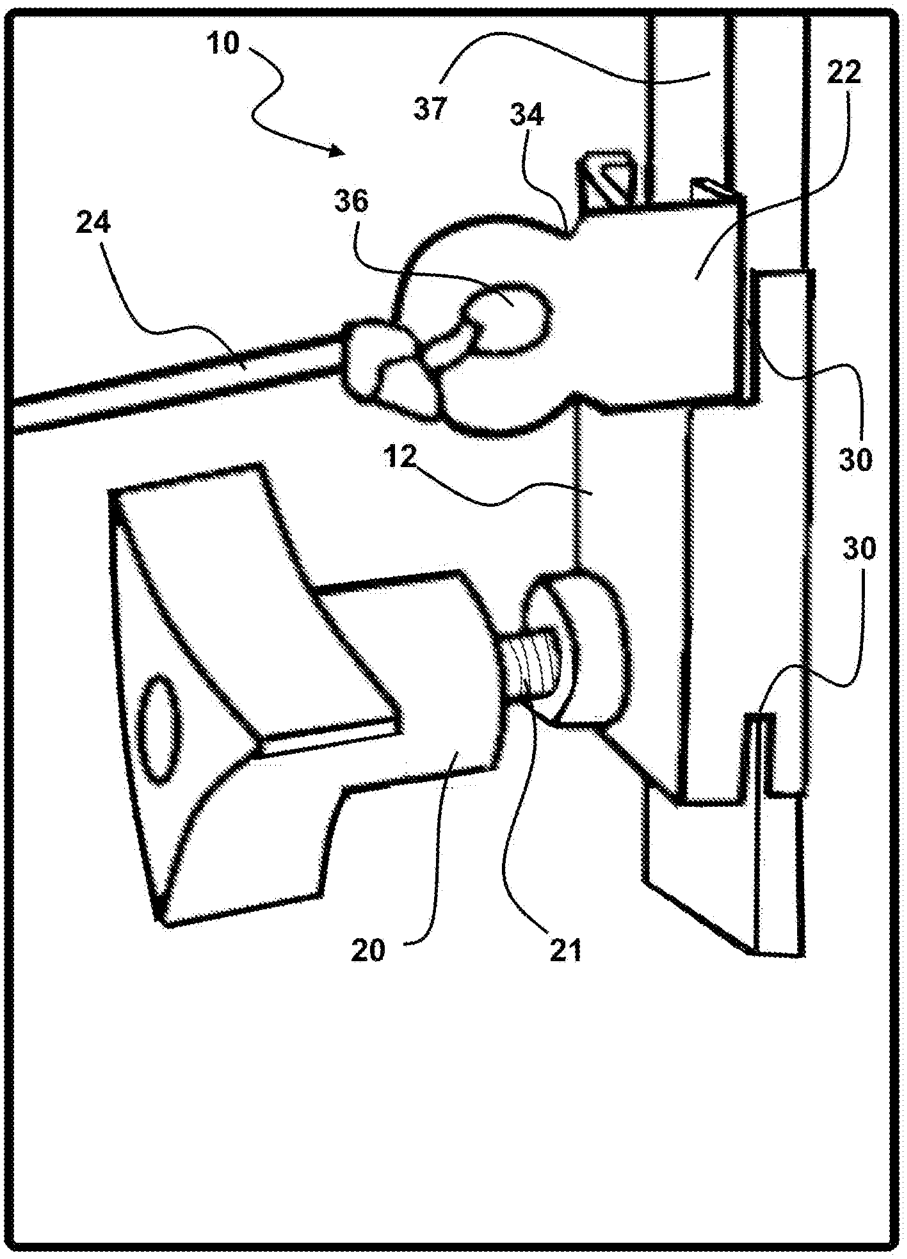
FIG. 7 shows an enlarged depiction of the housing of FIG. 6 which is in a sliding engagement with a projecting member, and showing the releasable connector engageable to hold the housing in the depicted temporary fixed positioning.

In FIG. 4 is depicted an enlarged view of the housing 12 of FIGS. 1 and 3, which is similar to and operates the same as the housing 12 shown in FIGS. 6-7. As shown, the housing 12 has a body formed by a sidewall 14 which surrounds and defines an axial cavity 16 running through the housing 12. The housing 12 in all modes herein, is removably positionable upon a member 18 communicating through the axial passage 16 by a tightening of a housing connector 20. As shown, rotation of the housing connector 20 in a first direction causes a projection 21 in threaded engagement through the sidewall 14 to contact against the surface of the member 18 within the axial passage 16. Rotating the housing connector 20 in an opposite direction will cause disengagement of the projection 21 from the member 18. Also shown and common to all modes of the device 10 herein, are connector mounts for the connector clips 22, such as one or preferably a plurality of slots 30 configured to removably hold the connector clip 22 to the housing 12, during a stretching of a string 24 engaged with a connector clip 22. As shown in the drawings, an angled projection 28 on the clip connector 22 will slide into the slots 30 and hold the string 24 engaged to that clip connector at the proximal end thereof, so it may be stretched taught.

As noted, the device 10 herein is employable for both snapping chalk lines which have been permeated with chalk material, such as against wall surfaces on a construction site, to leave a chalk line which provides a visual depiction of the proper angle or grade. Further, the device 10 can be employed with the string engaged and stretched, to provide a temporary positioning of a string 24, to serve as a visual grading reference.

Shown in FIGS. 5-8, are components and a method of employment of the device 10 for providing either chalk or marking lines on an adjacent surface, or providing a taught string 24 positioned over an underlying surface for a visual reference. In the simplest mode and method of employment of the device 10 herein, a single housing 12 may be operatively positioned at the correct determined height upon a member 18, by tightening the connector 20 thereon. Thereafter, the string 24 can be stretched taught between a proximal end of the string 24 engaged to the connector clip 22 engaged to the one housing 12, such as by positioning in a slot 30, and a distal end of the string 24, which may be placed in a fixed positioning at the correct height for the grade or slant. In this mode of the device 10 and method, the distal end of the string 24 in this simplest mode, is attachable to a fixed position on a nail or tack or with tape or glue, or other engagement means, to hold the distal end in a fixed position on an object such as a post or wall. The string 24 itself, or a chalked string 24 or chalk line imparted by snapping the string 24 on a surface, thereafter will provide the visual guide for angling.

Figure 8:
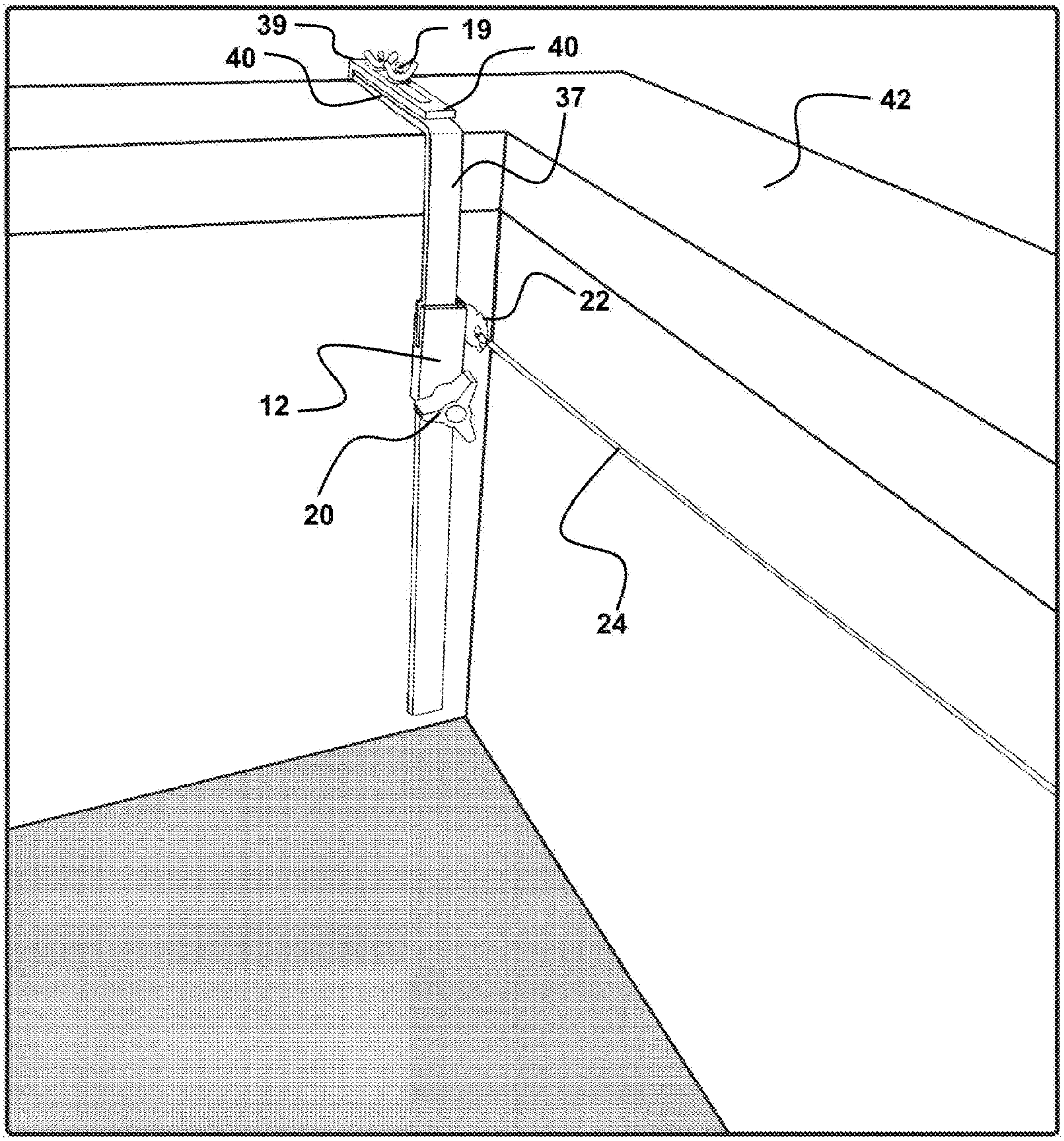
FIG. 8 shows the device herein as in FIG. 6, where the support member is U-shaped and engageable over a top or side surface of a wall to hold one end of the string during the snapping of a line on an adjacent surface.
Figure 9:
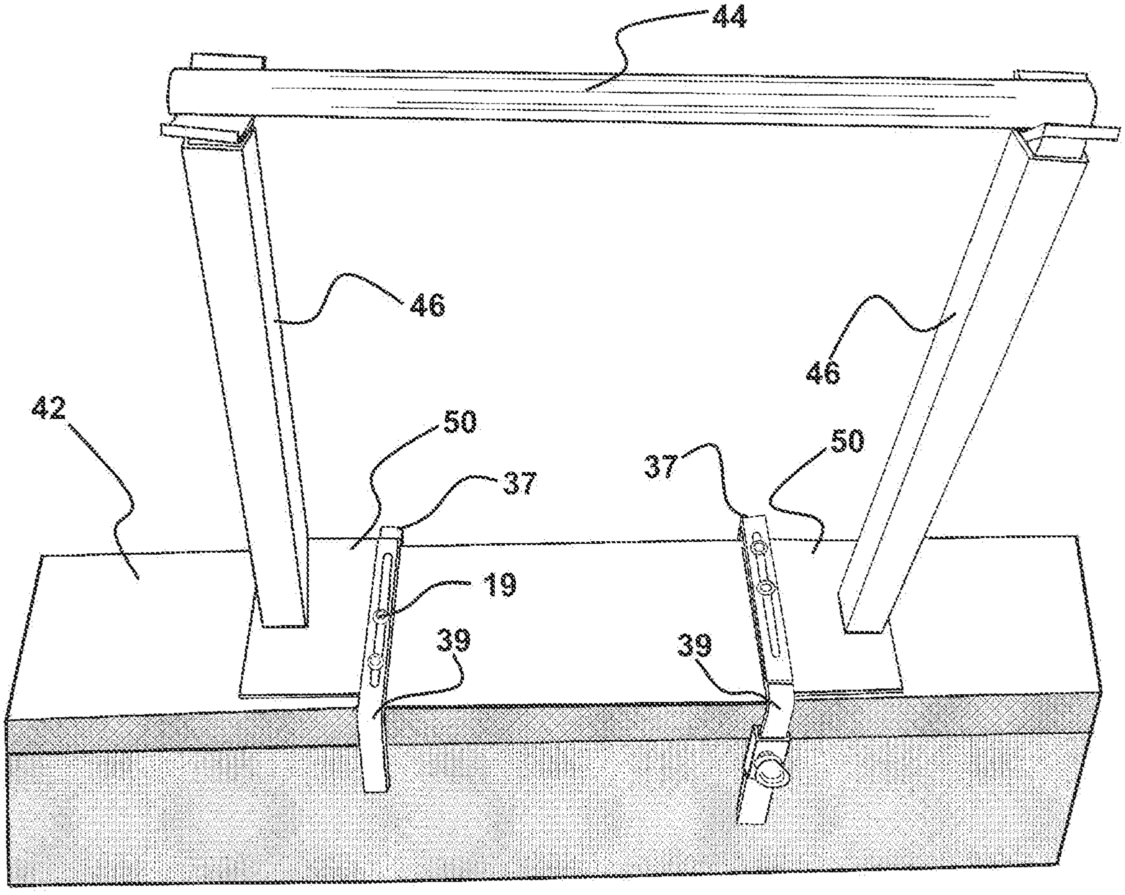
FIG. 9 depicts a mode of the device and system herein which includes a U-shaped support member which is compressibly engageable upon a wall to hold a reel stand engaged thereto.

However, the device 10 in a more preferred mode as shown in FIGS. 5-8, employs a first housing 12 which is positioned at the correct height on a first member 18 or pole or a U-shaped member such as the depicted clamping member 38 in FIGS. 6 and 8-9. Thereafter, a first connecter clip 22 is engaged with the first housing 12, and the string 24 at a proximal end, thereof, is engaged to the first connector clip 22.

Figure 5:
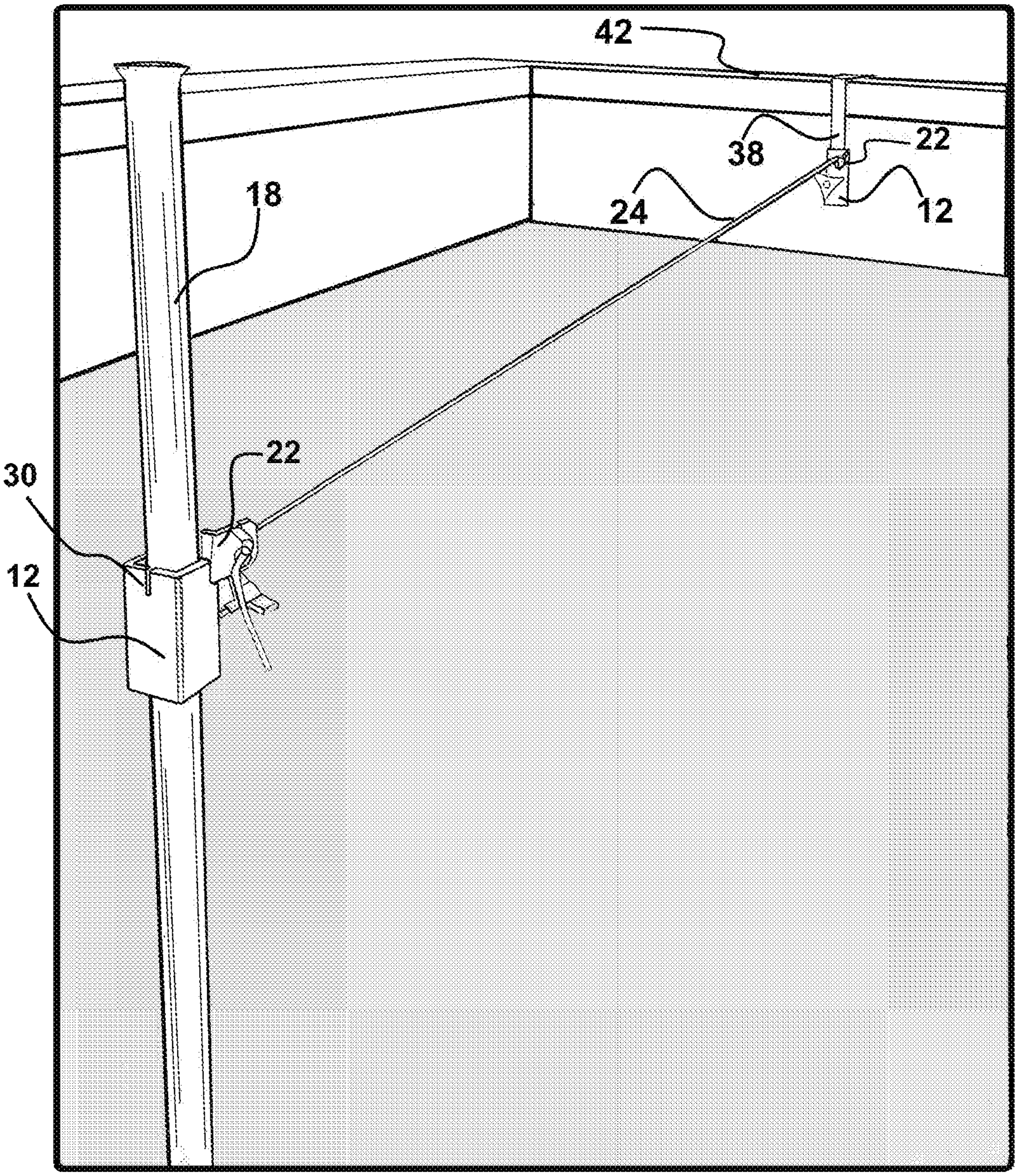
FIG. 5 depicts the system herein using a first housing and second housing operatively engaged to a respective first and second connector clip. Each is in a wound temporary engagement with one end of a string, shown deployed at a reference angle for slope grading of the underlying soil.

Thereafter, the string 24 is stretched taught, and engaged to a second connector clip 22 which is operatively engaged with a second housing 12, where that second housing 12 may already be fixed at the correct height and position on a second member 18, such as the member 18 depicted in FIG. 5, or a U-shaped member or clamping member 38 as shown in FIG. 6.

With the string 24 drawn taught between the respective engagements with first and second connector clips 22 on both the proximal and distal ends of the string 24, should the angle of the string 24 extending between the first housing 12 and second housing 12 need adjustment, such is simple. The user need only loosen the housing connector 20 on one or both of the first housing 12 and second housing 12, and slide them respectively on their respective engaged member 18 or U-shaped member, herein, a clamping member 38 to change the string angle.

It should be noted that in the simplest configuration, use of the device 10 herein, can include a single housing 12, and a single connector clip 22 may be all that is required. This is because most construction sites already have pipe, reinforcing bar, conduit, and other in-situ components which can function as the member 18, so long as the axial passage 16 of the housing 12 will surround and engage to them. Further, as long as the connecter clip 22 is configured for a non slip engagement of a string 24 thereto, that string 24 too, can be found on site or provided separately.

As such, it is envisioned that the device herein 10 can be provided in such a simple fashion, and yield significant utility, since a single user can still stretch a string 24 taught between a proximal end engaged to the connector clip 22 and the distal string end, which can be tied to a fixed point such as a nail, tack, projection, or other fixed point. So positioned, a single user or person, can now adjust the angle of the string 24 to be used itself as an angle reference, or which can be snapped on a wall or surface to leave chalked from the string 24 thereon.

In FIG. 5 is shown a first housing 12 engaged upon a pole or member 18 which is in a fixed position in the ground. However, the U-shaped member or clamping member 38 may also be employed if appropriate. A second housing 12 is engaged either in a similar fashion as the first, or as shown in FIGS. 5-6, the second housing 12 can be engaged to a U-shaped member or clamping member 38. A proximal or first end of the string 24 is engaged to a first connector clip 22 which is engaged to the first housing 12. A distal or second end of the string 24 is held in an operative position by a second connector clip 22 which is engaged with a second housing 12 engaged to a clamping member 38, which is shown enlarged in FIGS. 6 and 8.

When provided and employed with the device 10 herein such as in a kit of components, the U-shaped member or clamping member 38 has a first L-shaped support member 37 positioned across a gap defined by a wall thickness, from a second L-shaped member 39. On such a U-shaped member, parallel member portions 40, slide in relation to each other and can be fixed together at a proper space to hold onto the wall or surface, using fasteners 19, such as wing nuts and screws or other fasteners, to hold the formed U-shaped or clamping member 38 upon the wall 42. With a formed U-shaped or clamping connector 38, so engaged to the wall 42, a housing 12 can be slid through the axial passage 16 of the first member 37 and fixed in a determined proper position. This formed U-shaped or clamping member 38 is also shown in FIG. 8 being employed to secure one end of the string 24 at a determined proper height to allow for snapping the string to locate a chalk line on the adjacent wall 42.

Finally, shown in FIG. 9, is another component of the system herein which may be included such as in the form of a kit of components. Shown is a wire reel support 45 which allows for pulling of string or wire from a reel when supported by a cross member 44. The cross member 44 is supported on the distal ends of opposing posts 46. Each of the posts 46 is engaged at a first end, thereof, to a post support 50 which may be held in position on a wall or other projecting surface by a U-shaped or clamping member 38. Each U-shaped or clamping member 38 has been sized to a contact compressive engagement with the wall 42 by adjusting the first L-shaped portion 37 and second L-shaped portion 39, to position the respective parallel member portions 40 of each cause compressive contact with both sides of the wall 42. The L-shaped portions 37 and 39 are then fixed in position by tightening the fasteners 19, such as screws and wing nuts to form a temporary fixed positioning of the post support 50 atop the wall 42 such that a reel of wire or cable can be rolled from the cross member 44 without tipping the posts 46.

While all of the fundamental characteristics and features of the string line support system have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. A string line support comprising:

a housing having a sidewall, said sidewall extending between a first edge and a second edge;

said sidewall surrounding an axial passage;

said housing positionable to a mounted position upon a member positioned within said axial passage;

a first slot extending into said sidewall from said first edge thereof;

a connector clip, said connector clip having a body extending from a first end opposite to a second end thereof and having a first side edge and a second side edge positioned on opposing sides of said body of said connector clip, a first recess formed on said first side edge of said body of said connector clip;

a projecting portion extending from said connector clip;

said projecting portion configured for positioning within said first slot of said housing into an engaged position therewith;

a connection point located on said connector clip for engagement of a string thereto, said connection point including a passage through said body adjacent said second end of said connector clip, said passage forming a pathway for communication of said string therethrough, said first recess being aligned with said passage and providing a first recessed contact for said string extending from said passage for a winding of said string around said first side edge and second side edge of said body of said clip in said engagement thereto.

2. The string line support of claim 1 additionally comprising:

a housing connector, said housing connector engageable with said member positioned within said axial passage; and said housing connector for maintaining said housing in a fixed position upon said member while in said mounted position.

3. The string line support of claim 2 additionally comprising:

said projecting portion positioned proximal to said first end of said connector clip; and said connection point located proximal to said second end of said connector clip.

4. The string line support of claim 3 additionally comprising:

a second recess formed on said second side edge of said body of said connector clip; and said second recess being aligned with said passage and providing a second recessed contact for said string extending from said passage for a winding of said string around said first side edge and second side edge of said body of said clip in said engagement thereto.

5. The string line support of claim 4 additionally comprising:

a U-shaped member configured for an engagement upon a wall;

said housing positionable to said mounted position upon said U-shaped member.

6. The string line support of claim 2 additionally comprising:

a second recess formed on said second side edge of said body of said connector clip; and said second recess being aligned with said passage and providing a second recessed contact for said string extending from said passage for a winding of said string around said first side edge and second side edge of said body of said clip in said engagement thereto.

7. The string line support of claim 6 additionally comprising:

a U-shaped member configured for an engagement upon a wall;

said housing positionable to said mounted position upon said U-shaped member.

8. The string line support of claim 1 additionally comprising:

a second recess formed on said second side edge of said body of said connector clip; and said second recess being aligned with said passage and providing a second recessed contact for said string extending from said passage for a winding of said string around said first side edge and second side edge of said body of said clip in said engagement thereto.

9. The string line support of claim 8 additionally comprising:

a U-shaped member configured for an engagement upon a wall;

said housing positionable to said mounted position upon said U-shaped member.

10. The string line support of claim 1 additionally comprising:

a U-shaped member configured for an engagement upon a wall;

said housing positionable to said mounted position upon said U-shaped member.

11. A string line support comprising:

a housing having a sidewall, said sidewall extending between a first edge and a second edge;

said sidewall surrounding an axial passage;

said housing positionable to a mounted position upon a member positioned within said axial passage;

a first slot extending into said sidewall from said first edge thereof;

a connector clip, said connector clip having a body extending from a first end opposite to a second end thereof and having a first side edge and a second side edge positioned on opposing sides of said body of said connector clip, a first recess formed on said first side edge of said body of said connector clip;

a projecting portion extending from said connector clip, said projecting portion positioned proximal to said first end of said connector clip;

said projecting portion configured for positioning within said first slot of said housing into an engaged position therewith; and a connection point located on said connector clip for engagement of a string thereto, said connection point located proximal to said second end of said connector clip and including a passage through said body adjacent said second end of said connector clip, said passage forming a pathway for communication of said string therethrough, said first recess being aligned with said passage and providing a first recessed contact for said string extending from said passage for a winding of said string around said first side edge and second side edge of said body of said clip in said engagement thereto.

12. The string line support of claim 11 additionally comprising:

a second recess formed on said second side edge of said body of said connector clip; and said second recess being aligned with said passage and providing a second recessed contact for said string extending from said passage for a winding of said string around said first side edge and second side edge of said body of said clip in said engagement thereto.

* * * * *